3,017,413
FUNGICIDAL AGENTS AND MEANS OF PRODUCING THE SAME
Frank H. Tendick, Grosse Pointe Park, Paul E. Thompson, Grosse Pointe Farms, and Edward F. Elslager, St. Clair Shores, Mich., assignors to Parke, Davis & Company, Detroit, Mich., a corporation of Michigan
No Drawing. Filed Dec. 5, 1958, Ser. No. 778,324
4 Claims. (Cl. 260—279)

This invention relates to novel fungicidal agents and to means of producing the same. More particularly, the invention relates to the chemical compounds 3,6-dichloro-9-($\gamma$-[bis - ($\beta$-hydroxyethyl)amino]propylamino)acridine and acid addition salts thereof.

The compounds of the invention possesses significant fungicidal properties and hence are useful as fungicidal agents for agricultural or other purposes. The compounds are particularly effective in controlling tomato blight, especially the early blight due to *Alternaria solani* and the late blight caused by *Phytoplethora infestans*. For this purpose the compounds are made up in an aqueous spray, preferably with a dispersing and wetting agent to facilitate thorough contact, in the concentration of 0.03 to 0.25 pound of the compound for each hundred gallons of finished spray. The spray is applied to the plant crop to the point of drip-off as often as is required to provide control of infection.

The compounds can also be used to provide complete control of spore-germination of the pathogenic soil fungi *Fusarium oxysporum lycopersici* and *Rhizoctonia solani*. A water spray containing 10 parts by weight of the compound per million of finished spray has proven effective for this purpose.

In accordance with the invention the products are produced by condensing 3,6,9-trichloroacridine with $\gamma$-bis($\beta$-hydroxyethyl)aminopropylamine preferably in the presence of phenol and isolating the product either in the free base form or acid addition salt form. The temperature of the reaction can be varied widely and is not critical. In general, the condensation is favored by temperatures in excess of about 75° C. The reaction proceeds satisfactorily merely by contacting the starting materials and is favored by agitation or stirring of the reaction mixture. Although it is ordinarily unnecessary, an anhydrous inert organic solvent such as dioxane, high boiling petroleum ether and the like may be employed. It will usually be satisfactory to employ approximately equivalent quantities of the reactants but if desired an excess of either of the reactants can be employed. After completion of the reaction the mixture is neutralized with an excess of aqueous base such as ammonium hydroxide, sodium or potassium hydroxide, etc., and is then extracted with ether and dried. The product is conveniently obtained in acid addition salt form by acidifying the dried extract and recovering the soluble acid addition salt by filtration. The product can be further purified by drying and recrystallizing from a suitable solvent as ethanol or the like.

The invention contemplates, as indicated, both the free base and acid addition salt product forms and it includes salts of organic and inorganic acids broadly among which there may be mentioned, by way of illustration, the hydrochloride, hydrobromide, sulfate, phosphate, sulfamate, sulfonate, acetate, lactate, tartrate, gluconate, pamoate, citrate, cresotinate, salicylate, benzoate, naphthoate and like salts.

The acid addition salt products can be prepared by adding at least one equivalent of the desired acid to a solution of the free base, preferably under anhydrous conditions at room temperature with a solvent such as chloroform, ethanol, isopropanol and the like. Conversely, the free base can be obtained by neutralizing an aqueous or alcoholic solution of the salt with a basic agent such as ammonia, an alkali metal or alkaline earth metal hydroxide or carbonate, and the like.

The invention is illustrated by the following examples.

*Example 1*

9.2 grams of 3,6,9-trichloroacridine, 5.85 g. of $\gamma$-bis-($\beta$-hydroxyethyl)aminopropylamine and 25 g. of phenol crystals are mixed and heated at 110–115° C. for two hours with frequent stirring. The melt is cooled to about 75° C. and diluted with a mixture of 20 ml. of concentrated hydrochloric acid and 200 ml. of acetone, and chilled. The supernatant liquid is decanted from the precipitate and the latter boiled with methanol (20 ml.). The mass is diluted with several volumes of acetone, chilled, and the liquid again decanted from the precipitate. The latter is dissolved in one liter of water, filtered clear and treated with excess ammonia. A brown waxy precipitate forms changing to a yellow solid after standing about an hour. The water is decanted and the precipitate washed with water and recrystallized from ethanol acetone as fine crystals. The product is the free base 3,6-dichloro-9-($\gamma$-[bis - ($\beta$ - hydroxyethyl)amino]propylamino)acridine.

In order to convert the product to the dihydrochloride salt, the same is treated with excess alcoholic hydrogen chloride, partly evaporated and diluted with acetone. The dihydrochloride salt precipitates out and is collected and dried in vacuo; melting point 227–228° C. with decomposition.

To obtain the sulfate salt, 10 g. of the free base dissolved in ether is treated with an excess of concentrated sulfuric acid and the resulting precipitate is collected by filtration and dried under vacuum. The product is 3,6-dichloro-9-($\gamma$ - [bis-($\beta$ - hydroxyethyl)amino]propylamino)acridine sulfate. Likewise, the pamoate salt is obtained by mixing an ethanol solution of the free base with an ethanol solution of one equivalent of pamoic acid [4,4'-methylene-bis(3-hydroxy - 2 - naphthoic acid)] and collecting the precipitate by filtration.

*Example 2*

A solution of 8 g. of sodium 8-hydroxy-7-iodo-5-quinoline-sulfonate in 100 ml. of water is added at 70° C. with mechanical stirring to a solution of 4.86 g. of 3,6-dichloro-9-$\gamma$-bis - $\beta$ - hydroxyethylaminopropylaminoacridine dihydrochloride in 100 ml. of water. The solid crystalline salt which separates is recrystallized from an ethanol-water mixture. This product is 3,6-dichloro-9-($\gamma$-[bis-($\beta$-hydroxyethyl)amino]propylamino)acridine-di - 7 - iodo - 8-hydroxyquinoline-5-sulfonate.

The corresponding salicylic acid salt is prepared by treating a ligroin solution of the acridine base with an ether solution containing two equivalents of salicylic acid. The solution is chilled for several hours and the resulting crystalline disalicylate of 3,6-dichloro-9-($\gamma$-[bis-($\beta$-hydroxyethyl)amino]propylamino)acridine is recovered by filtration.

What is claimed is:

1. A member of the class consisting of 3,6-dichloro-9-(γ-[bis - (β - hydroxyethyl)amino]propylamino)acridine and acid addition salts thereof.
2. 3,6-dichloro-9 - (γ - [bis - (β - hydroxyethyl)amino]propylamino)acridine.
3. An acid addition salt of the product of claim 2.
4. The hydrochloric acid addition salt of the product of claim 2.

References Cited in the file of this patent

UNITED STATES PATENTS

| 2,531,011 | Surrey | Nov. 21, 1950 |
| 2,880,210 | Elslager et al. | Mar. 31, 1959 |

FOREIGN PATENTS

| 2,519/31 | Australia | June 11, 1931 |
| 789,696 | Great Britain | Jan. 29, 1958 |

OTHER REFERENCES

Jones et al.: J. Organic Chemistry, pp. 783–784, vol. 22 (1957).

Wiselogle: Survey of Antimalarial Drugs, vol. 11, part II, p. 1359 (1946).

Spalding et al.: J. American Chemical Society, vol. 68, pp. 1596–1598 (1946).

Great Britain, J. Pharmacol., vol. 11, 1956, pages 220–224.